William C. Gregory
Inventor.

William C. Gregory
Inventor

SELF-GREASING INSULATOR

Filed Oct. 26, 1964 5 Sheets-Sheet 3

William C. Gregory
Inventor

Nov. 15, 1966 W. C. GREGORY 3,286,016

SELF-GREASING INSULATOR

Filed Oct. 26, 1964 5 Sheets-Sheet 4

William C. Gregory
Inventor

Nov. 15, 1966 W. C. GREGORY 3,286,016

SELF-GREASING INSULATOR

Filed Oct. 26, 1964

5 Sheets-Sheet 5

William C. Gregory
Inventor

United States Patent Office 3,286,016
Patented Nov. 15, 1966

3,286,016

SELF-GREASING INSULATOR

William C. Gregory, 520 N. Burris Ave., Compton, Calif.

Filed Oct. 26, 1964, Ser. No. 407,623
6 Claims. (Cl. 174—30)

This invention relates to maintaining the resistance of insulators, as good as, when new or better, by continually removing the dust particles that fall upon the outer surfaces of the said insulators and at the same time keeping the said surfaces covered with a grease-like material. Grease-like material is here defined as material having physical properties not unlike the material obtained by frying a piece of bacon or a steak preferably a silicone-grease. This greased surface does not allow water (natural precipitation) to wet the surface of said insulator, but keeps the water in the spheroidal state as it rolls off the surface of the insulator. (The spheroidal state of water can be observed by pouring a little water upon the flat top of a HOT wood-fired cook stove. Silicone-grease as manufactured by Dow-Corning and/or General Electric can be bought in the highly dispersed state like kerosene to a grease as heavy as the conventional drug store vaseline.)

A primary object of this invention is to provide means for keeping the surface of the insulator coated with a water-repellant material (water-repellant is defined as material not wetted by water) which acts automatically to clean the surface of the insulator.

An important object of this invention is to provide a novel process for automatically pumping the water-repellant material from a reservoir to the surface of the insulator.

A particular object of this invention is the teaching of a method for coating nascent glass fibers with a resin so as to produce super-strong glass fibers both from the stand point of tensile strength and electric resistance.

Still another important object of this invention is to provide means for spinning the newly resin coated fibers parallel to themselves so as to get the maximum tensile strength per unit of fiber used.

A principal object of the invention is to provide a novel method for the commercial manufacture of this self-cleaning water-repelling insulator.

Another object of this invention is to get the maximum strength from the minimum amount of material by eliminating the "bight" in the winding pattern of the coated fiber glass. ("Bight" being defined as a "sharp bend.") Other objects of this invention will become apparent to those skilled in the art.

This invention relates to high strength and high electric resistant insulators made by winding continuous coated nascent glass fibers around the "holding fittings" to form the body of an insulator. The resin must be able to wet the surface of the glass fiber and stick to it tenaciously, such a resin may be a thermosetting resin, e.g., a styrene or an epoxy resin. This method of winding whereby the fibers all lay parallel to each other and so arranged that no "bight" (sharp bends) occurs is another aspect of this invention. When the winding is complete, the said fittings and windings are placed in a mold, the mold having a predetermined pattern, and then the resin and glass fiber are compressed so as to fill the mold and emboss the pattern thereon.

The number of passes made with the coated glass fiber and the distance between the holding fittings will depend upon the tensile strength and the electric resistance desired. The number of fibers used will depend upon the diameter of the individual fibers used. Polyester resins may be used especially if impregnated with a filler that protects against the effects of ultra-violet light. However, any synthetic resin that has the desired properties can be used. The proportion of fiber to resin should be about 2:1. The resin should coat the surface of the fiber completely and also fill the interstices between the fibers. When thermoplastics resins are used, the molding apparatus is heated to a curing temperature of about 200° F. for about five minutes. This will vary with different resins used. The resin is allowed to cure until the resin is set, when the insulator is removed. The mold may be heated by any of the conventional methods. When epoxy resins are used no heating may be necessary.

It is a well known fact that as the diameter of a glass or quartz fiber gets less the surface increases per unit of mass. When the fiber has a diameter of $2.5\times10^{-5}$ to $2.5\times10^{-7}$ inches, the fiber is commercially usable. In the trade fibers are generally classified as so many yards per pound size, for example, 15,000 yards per pound size. We have found that the 15,000 yard size is very satisfactory. Such fibers are extremely flexible, soft, absorbent and adsorbent. Silica or quartz fiber, the most insoluble and non-conductive we have, adsorbs water on its surface and immediately its conductivity is increased. Glass, a silicate, is much more soluble than quartz, with the result that hydration and/or hydrolysis is very noticeable. This hydration and/or hydrolysis that takes place on the surface of the glass fiber not only weakens the fiber mechanically (tensile strength) but also lowers its resistance. The glass fibers may be made from the conventional metal oxides, such as, sodium, calcium, mixed and fused with a non-metal oxide such as silica, having the proportions such as sodium oxide 15–18%, calcium oxide 9–12%, silica 72–74%, or the glass may be prepared containing none of these oxides. Various oxides may be added to lower the eutectic point, while cullet (broken glass) may be added to lower the fusion temperature. The chemically stable glass should be characterized by a low melting point, a working temperature of 1,000 to 1,300° C., a high viscosity, an inherent reluctance to crystallize when cooled below its freezing temperature, high tensile strength when formed into fibers and slight, if any, solubility. The glass is usually bought as marbles. These marbles are added to the crucible as the molten glass is withdrawn. The crucible may be made of the noble metals, e.g., gold, platinum etc., or a ceramic. The Aluminum Company of America makes a crucible of alumina which is quite cheap and very satisfactory. The crucible is preferably heated and controlled with electric energy.

It has been found that super-strength (both mechanically and electrically resistant) is obtained by coating the nascent fiber with a plastic-elastomer, very shortly after being drawn so as to prevent hydration and/or hydrolysis. The coating material may be a vulcanizable elastomer that is not effected by oil and/or grease-like materials, such as a neoprene or chlorinated rubber, flexible plastics which are thermoplastic but do not vulcanize, for example polyvinyl chloride, polyethylene, the halogenated hydrocarbons, the fluorinated hydrocarbons, such as Teflon, Kel-F, etc. etc., and the flexible epoxy resins, and a host of others. The physical properties most desired are (1) the ability to wet glass fiber and to adhere to it tenaciously, (2) inertness to atmospheric weathering, (3) high dielectric and mechanical strength, (4) not affected by oil and/or grease-like water-repellant materials, (5) must be flexible and non-flammable.

As soon as the nascent fiber is cool enough to have tensile strength, it is coated with finely divided particles of the coating material shot out from a hot hydraulic airless spray gun operating at about 1,000 to 2,500 p.s.i. The particles receive an electric charge immediately upon leaving the nozzle of the gun. The electrically charged particles are made to revolve around each strand and to cover each and every area. The coated fibers are then spun upon the grommets of the insulator. The temperature of the spinning operation is kept at such a temperature that the spun insulator will be about half-cured when removed from the spinning reel.

The hardware: The shackle of the clevis may be a steel casting and then rust-proofed, or an aluminum alloy casting. The clevis pin is preferably made from rust-proof steel. The grommet may be fabricated from stampings from either steel or aluminum, or a portion may be cast and then fabricated.

FIGURE 1 is a plan view, partly in section, of an outdoor power insulator. In this embodiment the glass-fiber rovings are impregnated with a plastic-elastomer. The clevis has a reservoir that also acts as the clevis pin.

Figures 1, 2, 3, 4, 5, 6, 6A, 6B, 26A, 26B:
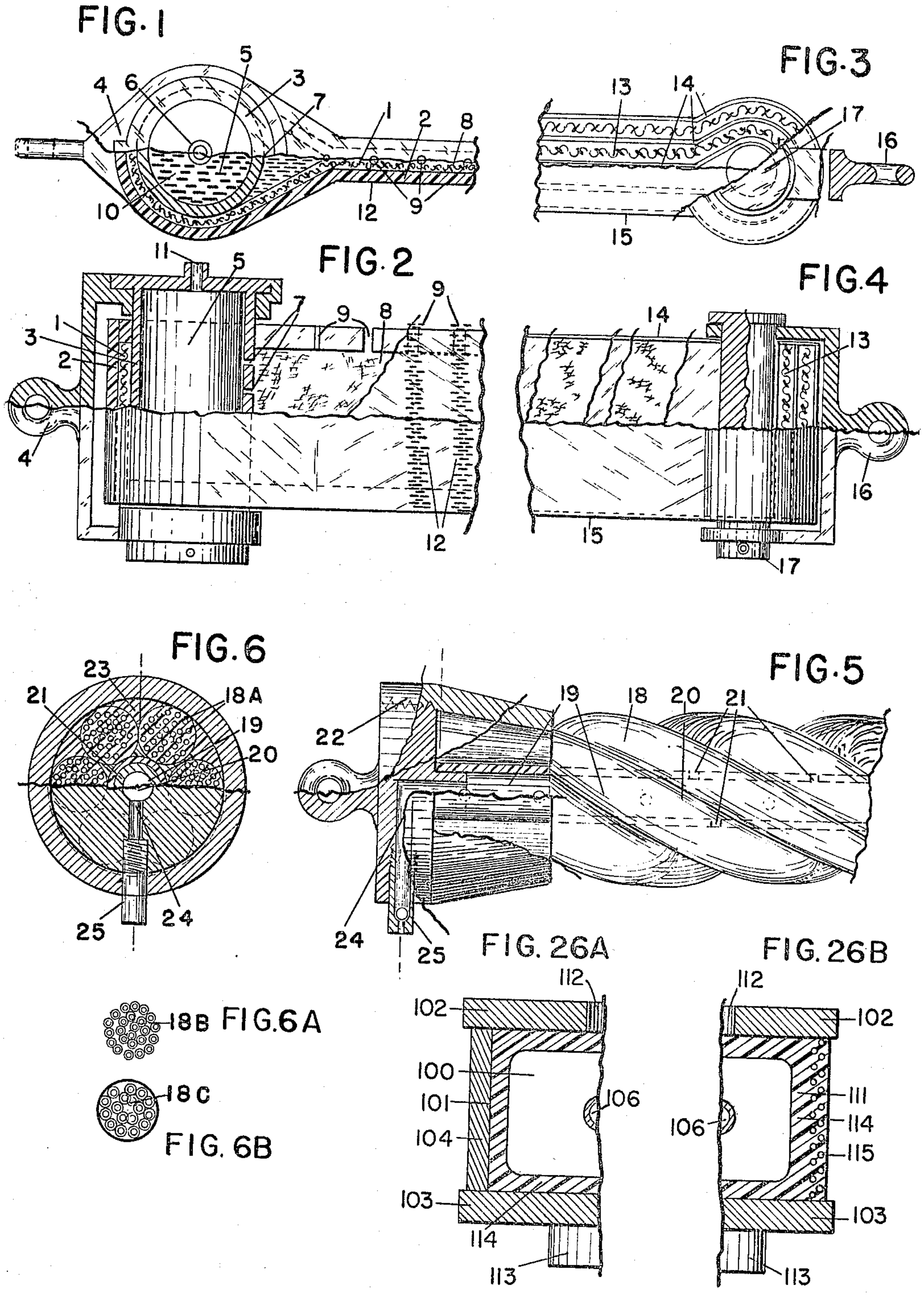
FIGURE 2 is a side elevation view, partly in section of FIGURE 1.
FIGURE 3 is a plan view, partly in section, of an outdoor insulator, that is made of a plurality of layers of Fiberglass webbing and impregnated with a plastic-elastomer. The clevis in this embodiment has a solid pin.
FIGURE 4 is a side elevation, partly in section, of FIGURE 3.

FIGURE 5 shows a rope-like structure of an out-door insulator. The strands of glass fiber run parallel to each other and are twisted like a rope around a center core. This center core member being able to conduct and distribute a water-repellant, grease-like material therethrough.

FIGURE 6 is an end view of a mechanical tightening socket, partly in section.

FIGURES 6A and 6B are cross-sectional views of modifications of the rovings as shown in FIGURE 6.

Figures 7, 8, 9, 10, 11, 12:
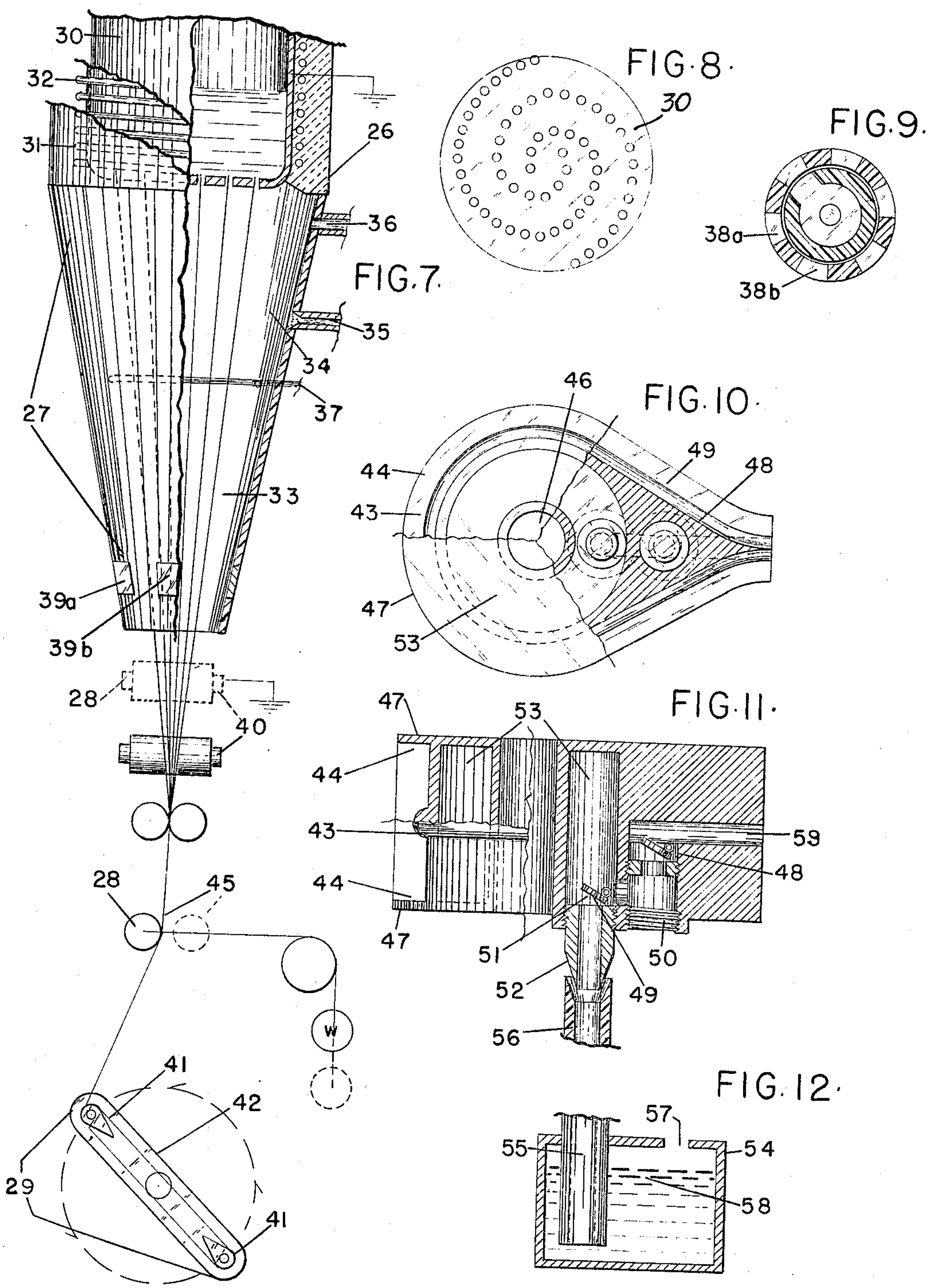

FIGURE 7 is a schematic view of an apparatus for making super-strong out-door insulators with coated nascent glass fibers.

FIGURE 8 is a pattern of the openings in the bottom of a glass melting pot of FIGURE 7.

FIGURE 9 is a plan view of a mechanical commutator.

FIGURE 10 is a plan view, partly in section, of an automatic grease dispersing grommet.

FIGURE 11 is a side elevation, partly in section, of FIGURE 10.

FIGURE 12 is a side elevation, partly in section, of a schematic drawing, for filling the automatic grease dispensing grommet, FIGURE 11.

Figures 13A, 13B:
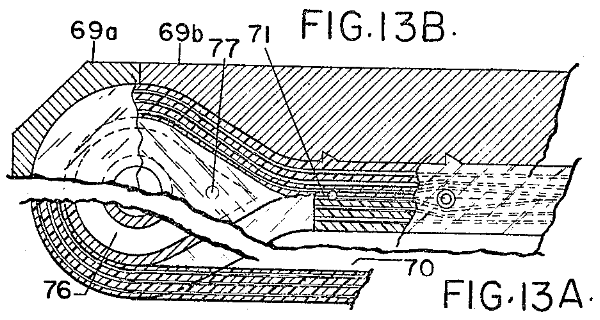

FIGURE 13A shows the plan view of a semi-cured insulator that has been removed from the spinning reel.

FIGURE 13B shows the semi-cured insulator, FIGURE 13A in the finishing press-mold and final cure stage.

Figures 14, 15A, 15B:
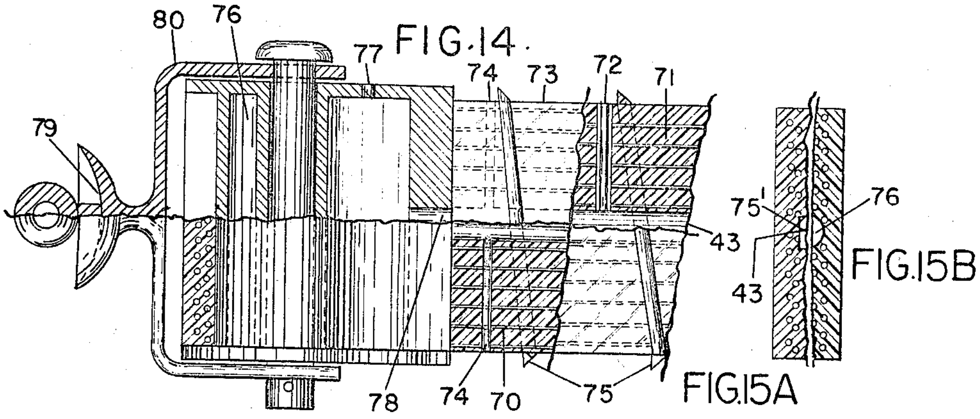

FIGURE 14 is a side elevation of the cured insulator after removal from the press, FIGURE 13B.

FIGURES 15A and 15B are cross-sections of insulator FIGURE 14 showing different embodiments of the grease carrying duct.

Figures 16, 17:
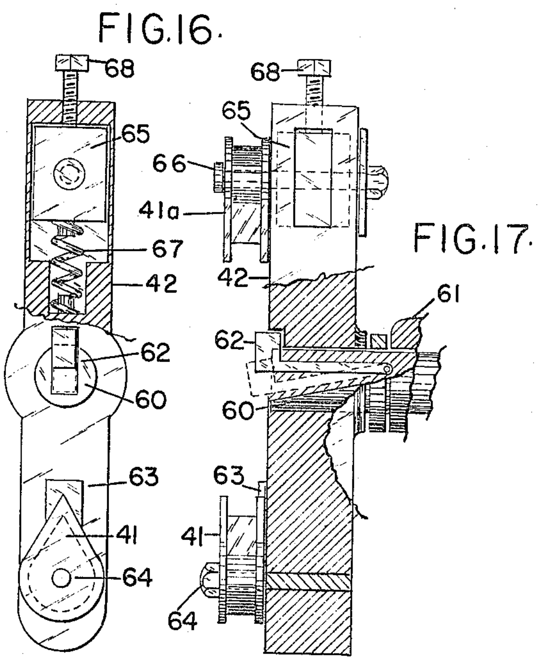

FIGURE 16 is a more detailed plan view of the spinning wheel and the spinning reel shown in FIGURE 7 (29).

FIGURE 17 is a side view of FIGURE 16.

Figures 18, 19, 20, 21:
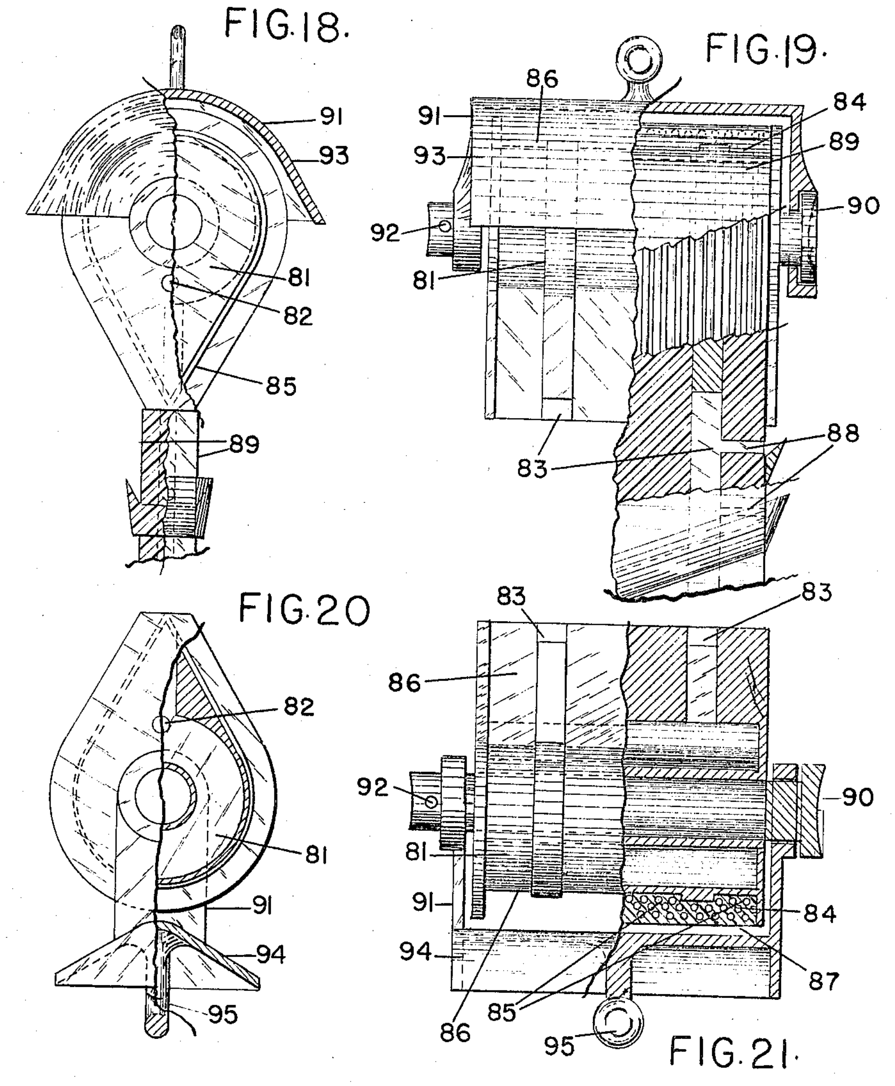

FIGURE 18 is a side view, partly in section, of the top member of a suspension type insulator.

FIGURE 19 is a front view, partly in section, of FIGURE 18.

FIGURE 20 is a side view, partly in section, of the bottom member of a suspension type insulator.

FIGURE 21 is a front view, partly in section, of FIGURE 20.

Figure 22:
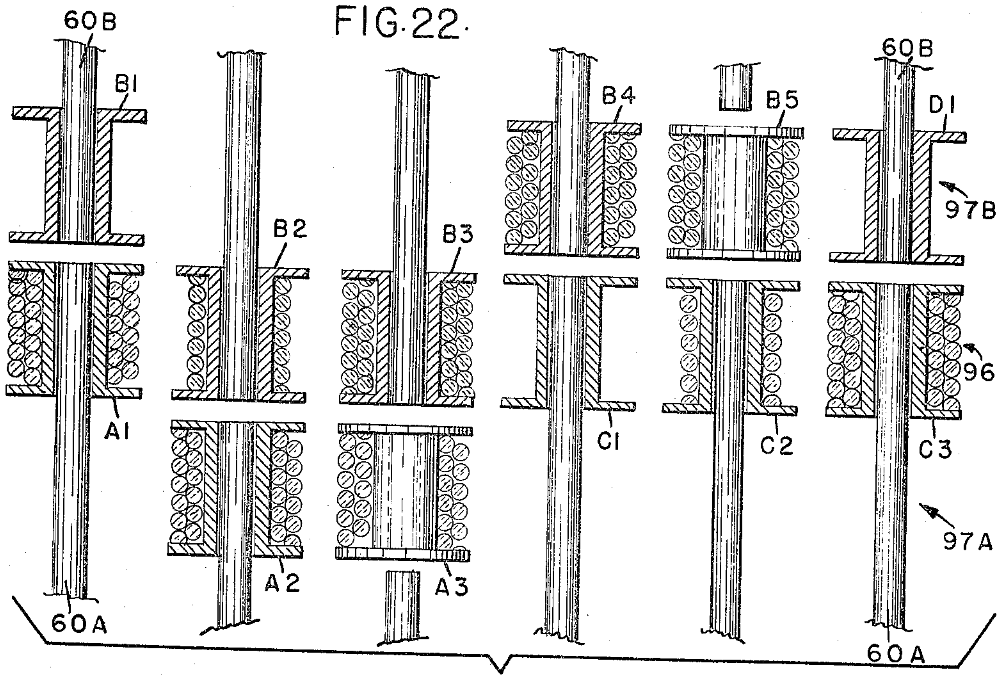

FIGURE 22 shows schematically a continuous method for spinning nascent plastic elastomer coated glass fibers into super-strength insulators, both mechanically and electrically stronger than un-coated glass fibers.

Figures 23, 24, 25:
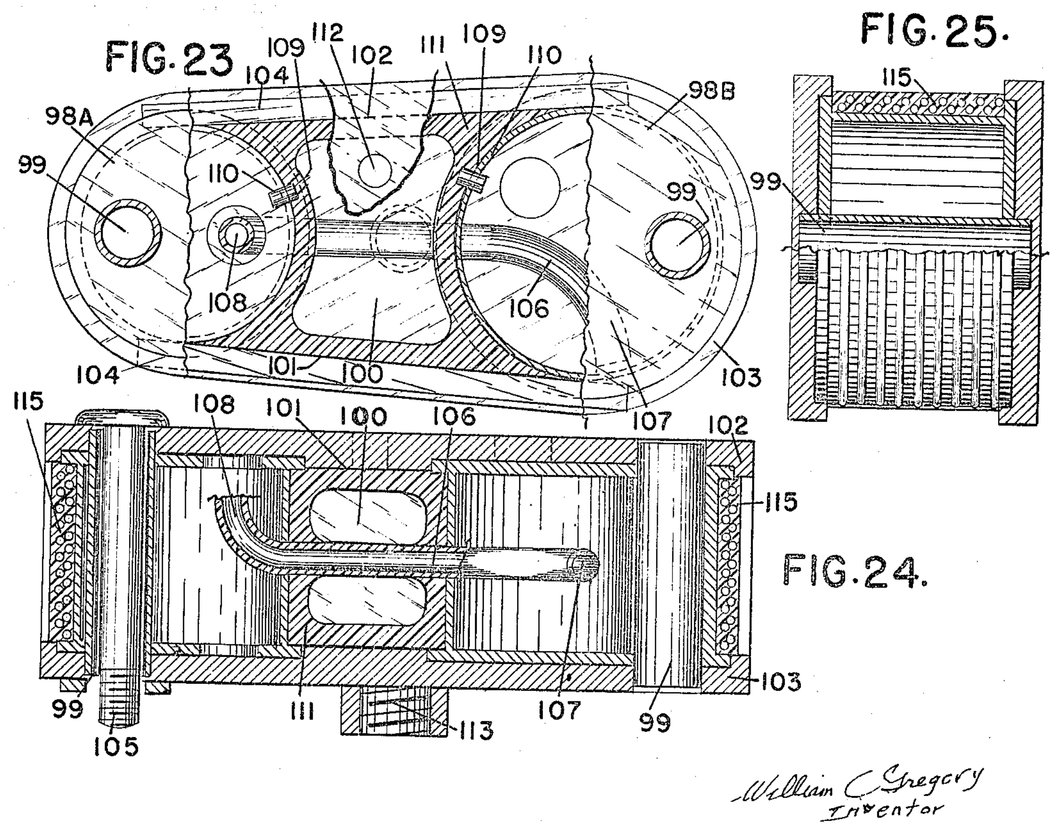

FIGURE 23 is a plan view, while FIGURE 24 is a side elevation of an insulator, partly in section, having a part of the reservoir made of a plastic-elastomer.

FIGURE 25 is an end view of FIGURE 23, partly in section.

FIGURES 26A and 26B are sectional views taken near the center of FIGURE 23.

FIGURE 26A shows the sides of the newly formed walls of the plastic reservoir, while FIGURE 26B shows the coated glass fiber rovings forming a one-piece structure between the sides of the plastic reservoir and the spun fiberglass rovings.

FIGURE 1 shows the plan view, while FIGURE 2 is a side elevation, partly in section of an-door power transmission insulator made from glass-fiber rovings 1 laid substantially parallel to each other, and impregnated with a plastic-elastomer 2. The impregnated glass-fibers are shown wrapped partially around a clevis pin 3 of the clevis 4. The clevis pin 3 is shown as having a reservoir 5. The reservoir shown here has an inlet 6 for filling the reservoir 5 with a water-repellant, soft grease-like material having a low surface tension, for example kerosene. The outlet 7 allows the grease-like material to enter the duct 8. This duct runs the full length of the insulator and has a plurality of small ducts 9 leading to the surface.

How it works: The reservoir 5 and the duct 8 are filled with a water-repellant gel-like material 10 through the means 11 and forced into duct 8 through the opening 7. The water-repellant material is then forced through the duct 8 and is discharged at the small ducts 9 where the water-repellant material slowly flows over the surface of the insulator 12. The slow movement of the grease-like material floats the dirt particles off and also makes the dirt particles as well as the surface non-wettable. FIGURE 3 shows the plan view, while FIGURE 4 shows the side elevation, partly in section, of an out-door power transmission insulator made up of a plurality of layers of spun glass-fiber webbing 13. As the webbing is wrapped over the clevis pin the webbing is impregnated and coated with a plastic-elastomer 14. The plastic-elastomer should be cured with a plastic-elastomer having thioxotropic properties so as to have a smooth, slick finished surface 15. In this embodiment the clevis 16 has a solid pin. FIGURE 5 is a side elevation, while FIGURE 6 is the end view of an out-door power transmission insulator made in the form of a rope. In this embodiment the glass-fiber strands may be twisted into rovings 18A and these rovings twisted around a hollow core 19 after which the rovings of glass fiber are impregnated with a plastic-elastomer, or the glass-fiber may be coated and then twisted into rovings 18B, the movings are then twisted around a hollow core 19 to make a rope, or the fiberglass strands may be coated, twisted into rovings and the rovings coated and impregnated 18C. The coated rovings are then twisted around a hollow core to form a rope-like structure. A duct 20 runs through the entire length of the core. Small holes 21 perforate the walls of the duct so that the water-repellant gel-like material can be forced through the ducts and ooze out upon the surface of the rope-like structure. The ends of the insulator are fitted with suitable fittings. The fittings here shown are of a metal screw clamp type socket 22. The insulator is secured in the socket by the contracting screw action and by cementing 23. The socket has a duct 24 running to the center of the socket where this duct connects with the duct 20 in the insulator. How it works: After installing the insulator on the cross-arm and fastening the electric wire to the lower socket, the insulator is filled with a water-repellant oil-like material through the fitting 25. As the electric wire sways in the breeze the strands of fibers move past the holes 21 thereby lubricating the rovings and at the same time covering the rovings with the oil-like material, thereby making it impossible for natural precipitation, for example, rain, snow, sleet, etc., to wet the rovings of the insulator. FIGURE 7 is a schematic sketch of the equipment for coating nascent glass fibers and then working the coated fibers into insulators that will have maximum mechanical (tensile) and insulating strength. The equipment consists of means 26 for forming glass fibers means 27 for coating the nascent fibers, means 28 for manipulating and coating the glass fibers and means 29 for spinning the coated glass fibers into insulators 29. The glass fiber forming equipment consists of a conventional glass melting pot 30 that is insulated at 31 for electrical and thermal resistance and is heated preferably by electric energy 32. The bottom of the pot or crucible is perforated with a plurality of small holes placed in a spiral manner, going from the periphery to the center, as illustrated in FIGURE 8. The fibers run at right angles to the bottom of the melting pot to form virtually a spiraling sheet. The apparatus 27 for coating the nascent glass fiber consists of a chamber 33 made of a non-conducting material. An opening 34 is provided through which nozzle 35 of the spraying equipment can discharge the coating material within the chamber 33. The spraying equipment may be, if the gas vehicle type is used, an ordinary compressed air paint spray gun. In this case the compressed air should be replaced with compressed dry nitrogen, carbon dioxide or other inert vehicles. However, the high pressure hot airless spray gun is preferred. This gun should be operated at about 1,000 p.s.i. hydraulic pressure. When finely divided solid coating material is used, a suitable dusting machine using an inert dry compressed gas could be used, similar to my dusting machine described in my Patent Number 2,729,917. The atmospheric pressure within the chamber 33 should be a little greater than the pressure outside so that atmospheric air *cannot* enter the chamber. When liquid coating material is used, the vapors given off will create enough pressure within the chamber to keep the atmospheric air out, however, when a dry dusting material is used, it is advisable to add enough dry inert gas to keep the pressure higher than atmospheric at all times. This inert gas could be introduced into the chamber as at 36. To cover all the surface of each fiber as soon as it has formed and cooled sufficiently to have the required tensile strength, the finely divided coated material is given a charge, immediately after leaving the spray gun nozzle 35, by passing the particles through an electrostatic field. This electrostatic field is most economically produced by the use of a transformer-rectifier unit that converts low A.C. voltage to high D.C. voltage—about 10,000 D.C. volts. This circuit consists of an electrode 37 connected to one pole of the source of direct current and the other pole is connected to the rotor of a commutator, FIGURE 9. The electrodes of the stator of the commutator (38*a*, 38*b*, . . .) are connected to the electrodes (39*a*, 39*b* . . .) respectively. The electrodes (39*a*, 39*b*, . . .) are placed in at least one plane, as shown. When the circuit is closed, a corona discharge takes place between the electrode 37 and the electrodes (39*a*, 39*b*, . . .) which ionizes the gas that is within the chamber. The particles passing through this ionized area take on a charge. Thus charged they seek the nearest electrode having the opposite charge, for example, 39*a*, but before the particle reaches 39*a*, 39*a* is de-energized and the electrode 39*b* is energized, and so on. These apparent revolving electrodes put a spin into each charged particle. This search of the charged particle to find an electrode with an opposite charge makes the charged particle migrate in and out and around the sheet like spirals and around each fiber before it comes to rest on the fiber. The optimum speed of the commutator and the D.C. voltage is determined experimentally.

Upon leaving the coating chamber, the coated fibers are arranged and put in place by the manipuating rolls 40. In starting a new insulator the grommets 41 are secured on the spinning reel 42. The rolls 40 are lowered so that the fibers spread out in such a manner that the fibers will not build up on the ridge 43, FIGURE 11. As the space between the ridge and the inside surface of the grommet 44 fills the rolls 40 move upwardly. After this space is filled, the fibers are spread uniformly across the face of the grommet until a predetermined amount of fiber has been built into the insulator. The fibers are kept taut by the take-up pulleys 45. The pressure that the take-up pulley exerts is just enough to keep the fiber well coated and the interstices well filled. The exact setting of the take-up pulley is determined experimentally. When fibers of the stated size are used, a cross-section of the finished spun product should have an area ratio of about 2:1 (fiber:resin).

FIGURE 10 is a plan view, while FIGURE 11 is a side elevation, partly in section, of a grommet which has a reservoir for storage of a water-repellant, oil-like gel and equipped to pump this gel into, through and out upon the surface of the insulator automatically. A hole 46 through which a cotter is placed, allows the pin on the clevis to hold the grommet and insulator in the clevis. The top and bottom plates 47 on the grommet protect the insulator from rubbing against the sides of the clevis. The ridge 43 provides a ready means for making a duct through the whole length of the insulator. The grommet is provided with two one-way valves 48 and 49. It is desirable to have the valves replaceable as illustrated. After valve 48 is screwed into place, a screw plug 50 is used to seal the opening. The valve 49 has a check plate 51 on one end, a grease supply fitting on the other end. This valve is also screwed into place. The grease-like material is stored in the reservoir 53.

It may be quite expensive to de-energize a circuit so as to re-fill the reservoir. FIGURE 12 shows schematically a device for filling the reservoirs while the insulators are supporting energized wires. A pressure vessel 54 is provided with a flexible non-conducting hose 55 which in turn is connected with a rigid non-conducting hollow rod . . . the hot-stick . . . 56. The hot-stick is provided with a fitting that meshes with the fitting on the grommet. By applying a pressure 57 over the surface of the grease-like gel that is within the pressure vessel, the gel is forced up into the reservoir 53. How it works: After the reservoir 53 has been filled with a water-repellant gel which may have a viscosity similar to a light engine oil rated as S.A.E. 10, the check plate 51 closes. When it gets warm the gel and the air within the reservoir expand, forcing the gel out through the opening 59 and into the duct in the insulator. When it gets cool or cold at night, the gel and air contract closing the valve 48 and sucking air in past the valve 51. Comes day and the process is repeated.

FIGURE 16 is a plan view, while FIGURE 17 is a side elevation view of the spinning wheel, FIGURE 7, 29. The spinning wheel consists of a driving shaft 60 that is properly mounted on the bearing 61. On the end of the shaft 60 is a keyed-latch 62 which not only locks the spinning reel 42 to the shaft but also holds the reel in position. Guides 63 provide means for placing the grommets in proper position. Grommet 41 is mounted on a rigid portion of the reel by bolt 64 while grommet 41*a* is mounted on a movable support 66. The support is spring loaded 67 and is controlled by the screw 68. After a predetermined amount of coated glass-fibers have been spun upon the grommets the spinning reel is removed from the spinning wheel by opening the key-latch 62. The spinning reel and the spun insulator, FIGURE 13A, are then placed in a finishing press-mold 13B. After the bolt 66 is loosened the press-mold 69*a*, 69*b*, . . . is closed, thereby bringing the two inner surfaces 70 and 71 together against a predetermined spring loaded 67 pressure. Before the press is closed, enough fresh coating material is added to more than fill all voids, if any. The insulator is kept in the mold until the coating material has cured, or has set properly, after which the insulator is removed. To free the grommets from the bolts 64 and 66 the tension screw 68 is screwed inwardly, thus relieving the pressure. This allows the finished insulator to easily slide out of the spinning reel 42. Under certain conditions it may be advisable to put a perforated plastic tube within the cavity made for the duct 43. Small tubes 72 leading from the ducts 43 to the surface 73 may be placed between the two inner surfaces 70 and 71 just before being pressed together for polymerization and final curing, or small holes 74 may be drilled to contact the duct 43 after the curing process.

FIGURE 15 is a cross-section of the insulator, FIGURE 14. The duct 43 may take the form of a rectangle 75′, a circle 76 etc. Insulators, without grease ducts may be made; however, insulators having at lease one grease duct are preferred. In the final press-mold and curing operation, it is desirable to cast plastic water-film breakers 75 upon the surface of the finished insulator. The grommet, in this embodiment, has a reservoir 76 for the storage of a grease-like material and means 77 for filling the reservoir. A duct 78 connects the reservoir 76 with the insulator duct 43.

FIGURE 14 is a side elevation of FIGURE 13B without the mold. The insulator is shown mounted in a clevis that has a metal-water-film breaker 79 cast into the shackle 80 of the clevis. This style of clevis should be used on dead-end constructions. FIGURE 18 is a side view, while FIGURE 19 is the front view of the top member of a suspension type insulator. FIGURE 20 is a side view while FIGURE 21 is the front view of the bottom member of a suspension type insulator. In this embodiment, the grommets are provided with a reservoir 81 and means for filling 82 as explained. In this embodiment two ducts 83 are formed by spinning the coated Fiberglas 84 between the ridges 85 that are on the outer surface 86 of the grommets and then filling the space 87 evenly to the edge of the grommet. The filled grommet is then formed into the finished product as explained. In the curing and/or final polymerization it is desirable to form trough-like ridges that will direct the grease-like material, that is made to ooze out of the discharge ducts 88, to flow over the entire surface 89 of the insulator.

A solid clevis pin 90 holds the grommet securely in the clevis 91 by placing a cotter pin in the hole 92 of the clevis pin. The top member has a deflecting cover 93 over the insulator, while a deflecting cover 94 is over the eye bolt 95. The object of the deflectors is to break any continuous water film (an electrolyte) which would otherwise provide a path for the electricity to go to ground.

FIGURE 22 shows schematically the principle of spinning the nascent coated Fiberglass upon mounted grommets to form insulators by continuously synchronizing two spinning wheels as described in FIGURE 17. The driving shafts 60A and 60B move at right angles to their bearings and also revolve on their bearings while carrying the spinning reel 42 which in turn carries the grommets 41 and 41A. Only the shaft 60A and 60B and cross-sections of several grommets are shown in this figure so as to simplify the description. The shafts 60A and 60B move in synchronism in both motions, moving the grommet in and out of the spinning area 96 and out and in on the loading and unloading areas 97A and 97B, at the same time revolving the spinning reels so that the grommets are face to face to each other. Shaft 60A is shown in the spinning position, while shaft 60B is in the loading and/or unloading position. A1 shows the grommet in the spinning position, and the spinning of the roving upon the grommet completed and ready to be removed. B1 shows an empty grommet ready to replace A1.

A2 shows the spun grommet removed from the spinning area and replaced by the empty grommet B2. After B2 has several layers of roving wrapped around it, the roving is cut between A2 and B2.

A3 shows the reel and the spun insulator removed from the shaft 60A, while B3 has the predetermined amount of rovings spun upon the insulator and is ready to be removed.

C1 shows a new grommet has replaced A3 and is in the spinning position, while B3 has been removed from the spinning position. After C1 has several layers of rovings spun upon it, the rovings between B4 and C1 are cut.

B5 shows the reel and the spun insulator separated from the shaft 60B. The filled grommet is now ready to be removed from the spinning wheel. C2 shows the grommet partially spun with the rovings.

C3 shows the spinning of the rovings on the grommet and the filled grommet ready to be removed from the spinning zone and replaced by a new and empty grommet, D1. FIGURE 23 is a plan view, while FIGURE 24 is a side elevation of a novel insulator made with grommets 98A and 98B having different size diameters, and the grommet eyes 99 off-center. In this embodiment the plastic reservoir 100 is made preferably from the same material that is used to coat the glass fibers. This plastic reservoir serves at least two purposes, namely (1) as a reservoir, (2) as a framework of the insulator. The reservoir 100 is formed within the cavity 101 that is made up of the two grommets 98A and 98B mounted upon a two member spinning reel. The spinning reel consists of an upper member 102 and a lower member 103. The side plates 104 are placed against the cylindrical sides of the grommets and between the upper and lower members of the spinning reel. The whole assembly is held together with bolts 105 placed through the grommet eyes 99. Before the final assembly, a discharge tube 106, made of a plastic is placed in the grommets so that the bottom of the tube 106 is in the lowest position 107 in the insulator, while the top end 108 is connected to a discharge nozzle, as explained. The grommet reservoirs are connected by holes 109 drilled through the cylindrical sides of the grommets. These holes are temporarily closed with corks 110, so that the liquid resin can not run into the grommet cavities, while forming the walls 111 of the plastic reservoir.

The upper member of the spinning reel 102 is provided with means 112 for introducing into the cavity 101 a predetermined amount of the plastic resin monomer. The lower member of the spinning reel 103 is provided with means 113 for mounting, first, the assembled parts upon a revolving device (not shown) that will rotate the assembled parts in at least two planes and preferably at right angles to each other, while the unpolymerized resin is curing and/or polymerizing. Curing and/or polymerizing is carried on until the walls of the plastic reservoir 100 have formed, or at least semi-cured. When the resin is semi-cured the revolving device is stopped, the bolts 105 are loosened and the side plates 104 are removed, after which the bolts 105 are tightened again. Secondly: the assembled parts are then mounted upon the spinning wheel shaft 60A or 60B where a predetermined amount of impregnated glass fiber rovings 115 are spun upon the freshly formed walls of the plastic reservoir 111 and upon the exposed outer cylinder surface of the grommets. After the spinning is complete, the insulator is removed from the spinning reel and the resin is given a final cure. After the resin in the insulator has been cured, the corks 110 are removed, thereby forming a passageway to all of the reservoir cavities. The discharge nozzles and check valves are then installed and all of the other openings sealed with screw plugs as outlined. The outer cylindrical surface of the grommet should be so treated that the resin will adhere tenaciously to the metal. The plastic reservoir should be cured only to the point where the partially cured coated glass fibers will readily blend into the sides of the plastic reservoir, thereby forming a one piece structure when finally cured.

FIGURE 25 shows the end view, partly in section, of a spun grommet. The glass fiber rovings 115 are completely coated.

FIGURE 26A is a cross section taken approximately across the center of FIGURE 23. The resin here shown has taken form 111 within the cavity 101 and is at least partially cured. FIGURE 26B shows the side plate 104 removed and a predetermined amount of coated glass fiber rovings 115 have been spun over the side of the plastic reservoir. The two portions of the structure are then fused and cured into a single one piece structure.

To give the insulator a smooth attractive outer surface, the insulator is dipped into a resin bath that has thioxotropic properties. The insulator is then removed from the resin bath and given a final cure while suspended in the air, at a predetermined temperature.

The water-repellant grease-like material used is preferably of a low viscosity having the property of creeping up, over and around on the surface of the insulator. Of the carbon-carbon grease-like water-repellant materials could be cited, paraffin dispersed in kerosene, or a soft grease dispersed in oils having a viscosity of S.A.E. 10 or less. However silicon-carbon grease-like water-repellant materials are preferred for the reason that if a flashover should occur, there is no graphite streak formed, as a carbon-carbon grease-like material will do.

The surface tension of the water-repellant material can be lowered by the addition of a surfactant of the fluorocarbon chain family. This may be desirable in cold weather.

Commercial rovings are generally coated with a lubricating material. This material must be burned off and at the same time the fibers must be annealed. As soon as the annealed fibers are cool enough, the fibers should be coated with a plastic resin as described. The resin or resins used must have at least the following properties: (a) must wet the glass fiber and adhere tenaciously to it, (b) must have light, weather and ozone resistance. The preferred resin is the epoxy resin.

Only certain embodiments of this invention have been described and certain other embodiments could be designed without departing from the principles of this invention.

I claim:

1. A self-greasing insulator embodying an elongated tubular electrically insulated connecting member, said connecting member including a plurality of holes along its length extending from the interior to the exterior thereof, a sealed terminal connected to one end of said connecting member thereby closing said end, an open terminal connected to the other end of said connecting member and containing a hollow reservoir which communicates with the interior of said connecting member, said open terminal having a normally closed access passage opening into said reservoir for the admission of grease and air thereto, and grease and air contained in said reservoir, said grease being of such quantity and viscosity that it will flow from said reservoir into the interior of said connecting member and out said plurality of holes therein onto the exterior surface of said conductor when the air pressure in said reservoir increases due to an increase in temperature and wherein ambient air enters said reservoir through said access passage when the air pressure therein decreases due to a decrease in temperature of said conductor.

2. A self-greasing insulator as defined in claim 1 wherein the access passage opening into said reservoir is normally closed by a one-way valve which permits air and grease entry only into said reservoir and not from said reservoir through said access passage.

3. A self-greasing insulator as defined in claim 2 in combination with a source of grease and a grease pumping means operatively connected with the access passage opening into said reservoir.

4. A self-greasing insulator as defined in claim 2 which includes a one-way valve between said reservoir and the interior of said connecting member which permit the flow of grease only from said reservoir into said connecting member.

5. A self-greasing insulator as defined in claim 2 wherein the outer surface of said connecting member has sharp ridges which will break the surface tension of water thereon.

6. A self-greasing insulator as defined in claim 2 wherein the terminals on each end of the connector have metal parts which are provided with water-film breakers.

References Cited by the Examiner

UNITED STATES PATENTS

| | | | |
|---|---|---|---|
| 461,631 | 10/1891 | Hewett | 174—30 |
| 1,493,262 | 5/1924 | Hammond | 174—30 X |
| 2,175,336 | 10/1939 | Austin | 174—30 |
| 2,933,553 | 4/1960 | Zuhlke | 174—211 |
| 2,980,158 | 4/1961 | Meyer | 156—245 |
| 3,024,302 | 3/1962 | Coggeshall | 174—177 |
| 3,056,167 | 10/1962 | Knoppel | 156—500 |
| 3,057,767 | 10/1962 | Kaplan | 156—172 |

FOREIGN PATENTS

| | | |
|---|---|---|
| 1,040,850 | 5/1953 | France. |
| 426,212 | 3/1935 | Great Britain. |
| 740,938 | 11/1955 | Great Britain. |
| 877,689 | 10/1960 | Great Britain. |

DOUGLAS J. DRUMMOND, LARAMIE E. ASKIN, *Examiners.*